(12) United States Patent
Zhang et al.

(10) Patent No.: US 7,114,134 B2
(45) Date of Patent: Sep. 26, 2006

(54) AUTOMATIC CIRCUIT DESIGN METHOD WITH A CELL LIBRARY PROVIDING TRANSISTOR SIZE INFORMATION

(75) Inventors: Xiaonan Zhang, Palo Alto, CA (US); Michael Xiaonan Wang, Stanford, CA (US)

(73) Assignee: Veri Silicon Holdings, Co. LTD, Santa Clara, CA (US)

( * ) Notice: Subject to any disclaimer, the term of this patent is extended or adjusted under 35 U.S.C. 154(b) by 272 days.

(21) Appl. No.: 10/856,732

(22) Filed: May 27, 2004

(65) Prior Publication Data
US 2005/0278660 A1    Dec. 15, 2005

(51) Int. Cl.
*G06F 17/50* (2006.01)

(52) U.S. Cl. .................. 716/3; 716/1; 716/2; 716/4

(58) Field of Classification Search ............ 716/3, 716/1, 2, 4, 17
See application file for complete search history.

(56) References Cited

U.S. PATENT DOCUMENTS

| | | | |
|---|---|---|---|
| 3,622,762 A | 11/1971 | Dyer et al. .............. 235/150 |
| 4,698,760 A | 10/1987 | Lembach et al. ......... 364/490 |
| 4,827,428 A | 5/1989 | Dunlop et al. ........... 364/491 |
| 5,388,055 A | 2/1995 | Tanizawa et al. ........ 364/491 |
| 5,459,673 A | 10/1995 | Carmean et al. ......... 364/489 |
| 5,487,018 A * | 1/1996 | Loos et al. ............... 716/11 |
| 5,598,347 A | 1/1997 | Iwasaki .................... 364/491 |
| 5,633,805 A | 5/1997 | Simonsen ................. 364/490 |
| 5,663,662 A | 9/1997 | Kurosawa ................. 326/41 |
| 5,673,200 A | 9/1997 | Toyonaga et al. ........ 364/490 |
| 5,724,250 A | 3/1998 | Kerzman et al. ......... 364/488 |
| 5,737,236 A | 4/1998 | Maziasz et al. .......... 364/490 |
| 5,763,907 A | 6/1998 | Dallavalle et al. ....... 257/202 |
| 5,805,459 A | 9/1998 | Kapoor .................... 364/489 |
| 5,838,579 A | 11/1998 | Olson et al. ............. 364/488 |
| 6,195,630 B1 | 2/2001 | Mauskar et al. ......... 703/18 |
| 6,209,122 B1 | 3/2001 | Jyu et al. ................. 716/6 |
| 6,336,207 B1 | 1/2002 | Shinomiya et al. ...... 716/11 |
| 6,345,379 B1 | 2/2002 | Khouja et al. ........... 716/4 |
| 6,467,068 B1 | 10/2002 | Iyer et al. ................ 716/6 |
| 6,480,815 B1 | 11/2002 | Olson et al. ............. 703/14 |
| 6,490,715 B1 * | 12/2002 | Moriwaki et al. ........ 716/17 |
| 6,496,965 B1 | 12/2002 | Van Ginneken et al. .. 716/10 |

(Continued)

OTHER PUBLICATIONS

Assenmacher, "BSIM4 Modeling and Parameter Extraction", Jan. 2003, Infineon Technologies AG, CL TD SIM viewgraphs, 23 pages.*

*Primary Examiner*—Sun James Lin
(74) *Attorney, Agent, or Firm*—Lumen Intellectual Property Services, Inc.

(57) ABSTRACT

A simple, approximate power optimization in connection with automatic large scale circuit design using a cell library is provided. The cell library of the present invention provides active region information for each cell, and preferably also provides conventional parameters such as cell physical area and cell performance information. Typically, several cells having differing parameters correspond to each cell function provided by the library. A cost function is defined which depends on active region information, and can also depend on physical area and performance. A cell design including cells selected from the library is optimized by substitution of functionally equivalent cells from the library to minimize the cost function. Minimization of active region area provides a simple way to approximately minimize power consumption. Optionally, a second optimization can be performed with a higher fidelity power model using the approximately power-minimized design as a starting point.

31 Claims, 2 Drawing Sheets

U.S. PATENT DOCUMENTS 6,671,859 B1    12/2003   Naylor et al. .................. 716/2
7,017,131 B1*   3/2006    Barnes ......................... 716/6
2004/0153986 A1*   8/2004   Sahara et al. ................. 716/10

* cited by examiner

| function | width @ 0.1 μm length (μm) | width @ 0.15 μm length (μm) | active area (μm²) | physical area (μm²) |
|---|---|---|---|---|
|  |  |  |  |  |
| AND2-X1 | 0.5 | 0.0 | 0.05 | 0.25 |
| AND2-X2 | 1.0 | 0.0 | 0.1 | 0.5 |
| AND2-X3 | 1.5 | 0.0 | 0.15 | 0.75 |
|  |  |  |  |  |
| OR4-X1a | 0.5 | 0.0 | 0.05 | 0.25 |
| OR4-X1b | 0.0 | 0.5 | 0.075 | 0.25 |
| OR4-X2a | 1.0 | 0.0 | 0.1 | 0.5 |
| OR4-X2b | 0.0 | 1.0 | 0.15 | 0.5 |
|  |  |  |  |  |
| DFF-X1a | 0.5 | 0.0 | 0.05 | 1.0 |
| DFF-X1b | 0.35 | 0.15 | 0.0575 | 1.0 |
| DFF-X1c | 0.15 | 0.35 | 0.0675 | 1.0 |
| DFF-X1d | 0.0 | 0.5 | 0.075 | 1.0 |

Fig. 2

AUTOMATIC CIRCUIT DESIGN METHOD WITH A CELL LIBRARY PROVIDING TRANSISTOR SIZE INFORMATION

FIELD OF THE INVENTION

This invention relates to the automatic design of large scale circuits.

BACKGROUND

Design of large scale electrical circuits is frequently automated by provision of a library of standard cells for performing various circuit functions. Such functions can include, for example, logic functions such as AND2 (a 2-input AND gate) and OR4 (a 4 input OR gate). A standard cell library typically provides multiple cells having the same function (e.g., AND2) and differing in drive strength (e.g., AND2X1, AND2X2, etc.). Cells having higher drive strength generally consume more electrical power, but can be used to drive a larger load, or can be used to improve circuit speed. Design of a large scale circuit can often be regarded as a problem of selecting cells from a library in accordance with a circuit functional design, where the drive strength of each cell is automatically selected to optimize circuit design. For a large scale circuit, this design optimization problem is highly nontrivial.

Typically, performance (e.g., speed), power consumption and size (e.g., total physical area) are the variables of greatest interest for optimizing circuit design, and therefore such information is typically provided for each cell in a standard cell library. Although the physical area of a cell is a simple parameter to quantify, cell power consumption and cell performance are much more difficult parameters to accurately quantify. In particular, accurate calculation of power consumption is of particular concern, since hard design constraints tend to be applied to performance, leaving total circuit power consumption as a quantity to be minimized in design. Thus power consumption (e.g., as measured by battery life) has emerged as a key point of product distinction in competitive markets.

Accordingly, ever more elaborate models for large scale circuit power consumption have been under development for some time now, to provide improved agreement between calculated power consumption and actual power consumption. Actual power consumption can then be reduced by use of such an accurate model during design optimization. State of the art power modeling accounts for the state-dependence of power consumption, often by extensive simulation of expected typical state sequences. The dependence of power consumption on switching or toggling rate is also included in state of the art power modeling, and here also it is necessary to simulate input sequences or make assumptions about the inputs. Such models also account for both dynamic power consumption (i.e., power consumed during switching) and leakage power consumption (i.e., power consumed other than during switching).

For some applications, reduction of leakage power consumption is especially important. Such applications include mobile telephones, since these battery-powered devices are typically in standby most of the time, and in active use the rest of the time. Power consumption during standby is primarily leakage power consumption, while dynamic power consumption occurs during active use. The state-dependence of power consumption discussed above applies to dynamic power. For example, a region of a computer processor chip can have a different dynamic power consumption depending on which application a user is running (e.g., a word processing program or a game). Thus modeling of dynamic power consumption requires assumptions about typical use, and such models become increasingly inaccurate as the difference between actual use and assumed use increases. The state-dependence (if any) of leakage power consumption is typically negligible in practice.

However, such high-fidelity modeling of power consumption makes great demands on processing resources, and is therefore a major driver for total design time. Accordingly, it would be a significant advance in the art to reduce design time of power-optimized large scale circuit designs.

SUMMARY

The present invention provides simple, approximate power optimization in connection with automatic large scale circuit design using a cell library. The cell library of the present invention provides active region information for each cell, and preferably also provides conventional parameters such as cell physical area and cell performance information. Typically, several cells having differing parameters correspond to each cell function provided by the library. A cost function is defined which depends on active region information, and can also depend on physical area and performance. A cell design including cells selected from the library is optimized by substitution of functionally equivalent cells from the library to minimize the cost function. Minimization of active region area provides a simple way to approximately minimize power consumption. Optionally, a second optimization can be performed with a higher fidelity power model using the approximately power-minimized design as a starting point.

BRIEF DESCRIPTION OF THE DRAWINGS

FIG. 2 shows an example of library database information in accordance with an embodiment of the invention.

DETAILED DESCRIPTION

Figure 1:
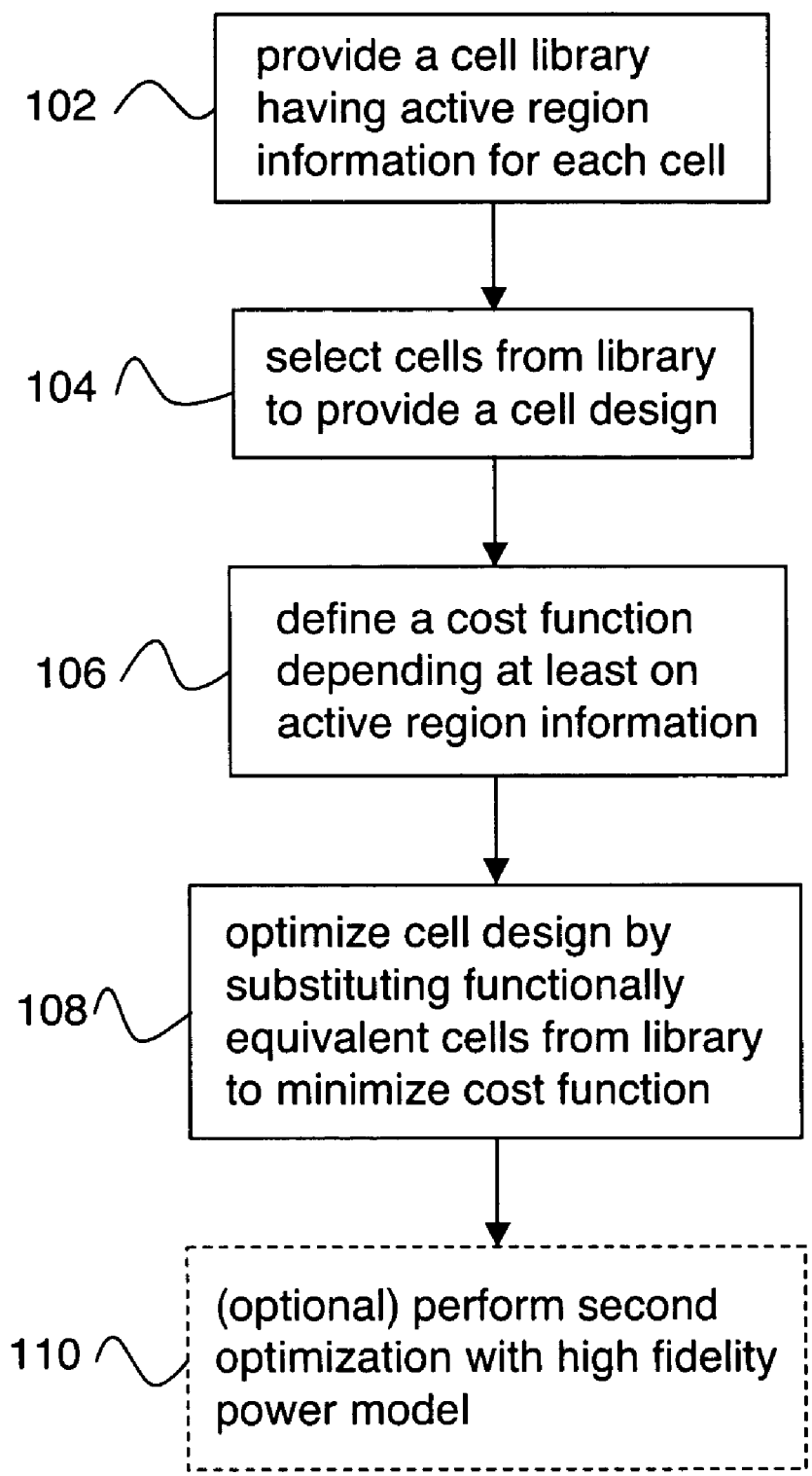
FIG. 1 shows a flow diagram of a method according to an embodiment of the invention.

FIG. 1 shows a flow diagram of a method according to an embodiment of the invention. In step 102, a cell library is provided that includes active region information for each cell. This cell library preferably also provides conventional design parameters for each cell, such as cell physical area and performance metrics such as cell speed (or delay) and cell power consumption. As indicated above, these performance metrics can include sophisticated speed or power consumption models. Active region information can be the total transistor active area within the cell. Alternatively, in cases where transistors having differing aspect ratios are used within a single cell, active region information can be a total width for each transistor length in a cell (or vice versa).

Active region information is provided by the cell library of the present invention to enable simple approximate minimization of cell power consumption using active region information. For example, total transistor active area within a cell correlates well with cell power consumption. Thus, minimizing total active area for all cells in a circuit design will provide an approximate minimization of circuit power consumption. Note that this approximate power optimization is significantly different from the conventional minimization of circuit physical area by minimizing the sum of cell physical areas. Although cell physical area also tends to correlate with cell power consumption, the reason is that cell physical area and cell active area are correlated. Thus active area is more directly related to power consumption than physical area. Therefore, the approximate minimization of power consumption provided by use of active region information according to the invention is a significant advance beyond conventional physical area minimization.

In step 104 on FIG. 1, cells are selected from the library to provide a cell design. Typically, a circuit functional design is provided and cell design entails selection of cells from the library to perform the functions required in the circuit functional design. For each cell function provided by the library, several different cells are typically included in the library. Thus cell design entails selection of which library cell to use for each function required in the circuit functional design. Since cell designs are usually automatically optimized, the initial cell design provided in step 104 can be based on nominal selections for each cell. For example, each cell function in the library can have one of its corresponding cells designated as the nominal or default cell to use for that function.

In step 106 on FIG. 1, a cost function is defined, which depends on active region information, and can also depend on other parameters, such as physical area and/or performance. Since cell design typically proceeds by automatic minimization of a cost function, definition of the cost function in this manner is a key step of this method according to the invention. More specifically, the cost function is an increasing function of an active area of at least one of the cells in the cell design, and is preferably an increasing function of the active area of all cells in the cell design. Due to this characteristic of the cost function, minimization of the cost function will tend to minimize total active area, and thereby approximately minimize power consumption. Note that a cost function of this kind cannot be used with a conventional cell library that does not provide active region information relating to its cells.

Automatic circuit design is usually formulated as minimization of a cost function to provide maximum flexibility to a designer, e.g., by capturing design trade offs. For example, suppose increasing delay by 1% to reduce power consumption by 1% is desirable, while increasing delay by 3% to reduce power consumption by 1% is undesirable for a particular circuit. A cost function $f=1.02$ A+D, where A is active area (an approximation for power consumption) and D is delay, captures the above trade off in terms suitable for automatic design. By weighting A more heavily than D in the cost function f, automatic minimization of f naturally encourages reduction of power consumption by increasing delay in accordance with the above-assumed design considerations.

Alternatively, a cost function which depends on a single variable (e.g., $f=A$) can be used, and leads to a design that is optimized with respect to that single variable (e.g., minimal A). Thus both multi-dimensional design trade offs and single variable design optimizations can be formulated as minimization of a cost function.

In step 108 on FIG. 1, the cell design is automatically optimized to minimize the cost function. Substitution of a functionally equivalent library cell for a cell in the cell design will typically change the cost function value. If the new cost function value is lower than the old cost function value, the change is an improvement, and is made. If the new cost function value is larger than the old cost function value, the change is not an improvement, and is not made. Systematic repetition of such substitutions will tend to incrementally improve the cell design. Cell substitution can be performed on single cell, or can be performed on multiple cells simultaneously.

Various algorithms are known for automatically, systematically and efficiently performing this optimization, and any such method can be used to practice the invention. Upon completion of step 108, an cell design D0 is provided, which is optimal according to criteria including minimal active area. Since active area correlates to power consumption, the design D0 provides approximately minimal power consumption.

Importantly, design D0 can be determined in far less design time than is usually required to determine a minimal-power design. The reason design D0 can be obtained with relatively low design time is that active region geometrical parameters (e.g., areas, lengths and/or widths) are far simpler optimization parameters than actual power consumption. In particular, such geometrical parameters are not state dependent, and can thus be evaluated without regard to typical inputs or assumed state sequences. In some cases, the design D0 having approximately minimal power consumption will be a suitable final design.

Alternatively, design D0 can be used as a starting point for an optional power optimization step 110 on FIG. 1. In step 110, a conventional power-consumption model is used for further optimization of design D0. The output of step 110 on FIG. 1 is a cell design D1 which is optimal according to conventional high fidelity power consumption modeling. Of course, in this case, the cell library must provide sufficient database information for each cell to enable such high-fidelity modeling. This information is available in conventional cell libraries, and can therefore also be made available in cell libraries according to embodiments of the invention.

A conventional design approach based on high-fidelity power consumption modeling can also be expected to arrive at design D1 from most starting points. However, the time taken to arrive at an optimal design such as D1 typically has a strong dependence on how close the starting point is to the final design D1. In particular, since the design D0 provided according to the invention has approximately minimal power (subject to other design constraints), it is typically much closer to design D1 than a nominal starting point. Thus, the total time required to obtain design D1 can be greatly reduced by first finding approximate design D0 according to the invention, and using D0 as a starting point for a determination of D1.

FIG. 2 shows an example of library database information in accordance with an embodiment of the invention. In the example of FIG. 2, only three functions are shown, namely a 2-input AND gate, a 4-input OR gate, and a D flip-flop (AND2, OR4 and DFF respectively). Of course, cell libraries typically provide many more functions in practice. It is also assumed that transistors have a standard length of either 0.1 μm or 0.15 μm in the library of FIG. 2. Active area geometrical information is provided for each cell in the example of FIG. 2. Specifically, the total active transistor area of each cell is given, as is the total width at each of the two standard transistor lengths. In some cases, active area is used in the cost function to approximately account for power consumption. In other cases, (e.g., where power consumption depends significantly on transistor aspect ratio), the cost function can include length and width parameters to more accurately account for power consumption. The physical area of each cell is also given.

Separate use of length and width parameters is especially relevant for leakage power, since leakage power depends on length and width independently, in contrast to dynamic power which tends to depend on area. For example, a 10% increase in channel length can decrease leakage by about a factor of 2. Thus, for cells having transistors with more than one channel length, the total width at each length is preferably provided by the cell library to enable this dependence of leakage power on channel length to be accounted for.

Three cells having differing drive strength provide AND2 functionality in the example of FIG. 2. In this example, it is assumed that all of the AND2 transistors have 0.1 μm lengths, and that the active area and physical area of the AND2 cells scale proportionally.

Four cells having differing drive strength provide OR4 functionality in the example of FIG. 2. In this example, it is assumed that two of the OR4 cells (i.e., OR4-X1a and OR4-X2a) have 0.1 μm transistor lengths, and the other two OR4 cells (i.e., OR4-X1b and OR4-X2b) have 0.15 μm transistor lengths. Note that some of the OR4 cells have the same physical area and different active areas.

Four cells having differing drive strength provide DFF functionality in the example of FIG. 2. In this example, it is assumed that some of the DFF cells contain transistors having both of the assumed standard lengths (i.e., 0.1 μm and 0.15 μm). Note that the DFF cells have the same physical area and different active areas.

From the example of FIG. 2, it is clear that physical cell area is not a parameter that can be regarded as equivalent to active area, or to other active region parameters such as total width at each standard length. Thus a cell library according to the invention that provides active region information provides information that is not presently available from conventional cell libraries. Such active region information can be used, in accordance with the invention as described above, to improve automated large scale circuit design with a cell library.

The preceding description of embodiments of the inventions is by way of example as opposed to limitation. Thus the invention can be practiced by making various alterations to the above-given details. For example, the preceding examples relate to automatic design by minimization of a cost function, since that is the standard problem formulation used in the art. However, maximizing a decreasing function of active area is equivalent to minimizing an increasing function of active area, so the invention can be practiced either way. Thus, the invention relates to optimization of cell design according to a target function which is a monotonic function of active area. If the target function is an increasing function of active area, then it is minimized, while if the target function is a decreasing function of active area, it is maximized.

The invention can also be practiced in cases where two (or more) different types of transistor are used in library cells. For example, transistors can be designed to reduce leakage power at the expense of increasing threshold voltage Vt, so for design flexibility it can be beneficial to provide cells in a library using two different transistor types. For example, let type 1 transistors have relatively low Vt and relatively high leakage power dissipation, while type 2 transistors have relatively high Vt and relatively low leakage power dissipation. Suppose cells A and B are made from type 1 and type 2 transistors respectively, and have the same active region geometrical parameters. Cells A and B would typically not have the same leakage power consumption, since they have different types of transistors.

There are several ways to account for different transistor types in practicing the invention. One method is to construct a simple leakage power estimate model having active region geometrical parameters and cell type as an input. For example, $P=K A$ for type 1 cells, and $P=0.5 K A$ for type 2 cells, where P is leakage power, A is active region area, K is the proportionality constant between area and leakage power for type 1 transistors, and for the purposes of this example, it is assumed that type 2 cells have half the leakage power consumption of type 1 cells.

An alternative approach is to define an effective active region area $A^*$, where $A^*=A$ for type 1 cells and $A^*=0.5 A$ for type 2 cells. Here the effective area $A^*$ can be used in design optimization since it is approximately proportional to leakage power. Thus, the simple power estimates of the present invention are also applicable to situations where several types of cells are present, where different cell types have different relations between active region geometrical parameters and power consumption.

In a preferred embodiment, a method of the present invention utilizes a cell library having cell drive strengths selected according to delay. Use of such a cell library is discussed in detail by the present inventors in a co-pending US patent application entitled "Standard Cell Library Having Cell Drive Strengths Selected According to Delay" filed on even date herewith and hereby incorporated by reference in its entirety. A cell library providing both active region geometrical information and having cell drive strengths selected according to delay is highly advantageous for circuit design. Provision of cells having drive strength selected according to delay reduces quantization induced over-design, and provision of active region information allows powerful automated design tools to efficiently select lower drive strength cells where appropriate.

For example, in a typical circuit design, roughly 20% of the circuit paths are timing critical, and the remaining 80% of the paths are not timing critical. Conventional cell libraries typically provide X1 as the smallest cell drive strength. Cells in paths which are not timing critical are usually the slowest available cells (e.g., X1 cells), leading to designs which typically have a very large fraction of X1 cells. Thus, over-design is commonplace in circuit paths which are not timing critical, since many X1 cells could be replaced by slower cells.

However, mere provision of slower cells having reduced power consumption in a cell library does not enable an automated design tool to efficiently utilize such cells, since power and timing analysis is typically too time-consuming to perform on non critical parts of the circuit. Thus, the active region information of this preferred embodiment enables efficient automatic utilization of slow, low-power cells by providing one or more simple parameters to the automatic design tool that correlate well with power consumption and speed. This approach can be regarded as an efficient optimization of the 80% or so of typical circuit paths that are not timing critical.

The preceding description relates to methods of the invention, and also provides various implementation details. Processors programmed to implement methods of the invention are also embodiments of the invention. Such embodiments can be stand-alone specialty processors, or can be general purpose computers running software implementing methods of the invention. Such processors can use any combination of hardware and/or software to implement methods of the invention. The invention can also be embodied as a set of computer instructions recorded onto a computer-readable medium (e.g., an optical or magnetic disk) for implementing methods of the invention.

The preceding description also relates to cell libraries according to the invention. A processor programmed to provide such a cell library is also an embodiment of the invention. The invention can also be embodied as a set of computer instructions recorded onto a computer-readable medium (e.g., an optical or magnetic disk) for providing a cell library of the invention.

What is claimed is:

1. A method for automatic design of a large scale circuit, the method comprising:
   a) providing a cell library comprising:
      i) a plurality of cells, each cell of said plurality of cells having a corresponding cell function; and
      ii) database information including one or more active region geometrical parameters for said each cell;
      wherein at least two of said plurality of cells have the same cell function and differing active region geometrical parameters;
   b) selecting a plurality of cells from said cell library to provide a cell design of said circuit;
   c) defining a target function of said cell design, wherein said target function is a monotonic function of said one or more active region geometrical parameters of at least one cell in said cell design; and
   d) substituting one or more cells in said cell design with one or more functionally equivalent cells from said cell library one or more times to optimize said cell design according to said target function.

2. The method of claim 1, wherein said database information further includes physical area of each cell in said cell library.

3. The method of claim 2, wherein said target function is a monotonic function of said physical area of at least one cell in said cell design.

4. The method of claim 1, wherein said database information includes a performance metric of each cell in said cell library.

5. The method of claim 4, wherein said performance metric comprises a cell power consumption model.

6. The method of claim 4, wherein said performance metric comprises a cell speed model.

7. The method of claim 4, wherein said target function is a function of said performance metric of at least one cell in said cell design.

8. The method of claim 1, further comprising optimizing said cell design to minimize power consumption calculated according to a power consumption model, said optimizing being subsequent to said substituting, whereby minimization of power consumption according to said power consumption model is obtained with reduced design time.

9. The method of claim 1, wherein said active region geometrical parameters comprise an active region area.

10. The method of claim 9, wherein said target function is an increasing function of said active region area, and wherein said substituting is performed to minimize said target function, whereby power consumption of said circuit is approximately minimized.

11. The method of claim 9, wherein said target function is a decreasing function of said active region area, and wherein said substituting is performed to maximize said target function, whereby power consumption of said circuit is approximately minimized.

12. The method of claim 1, wherein said active region geometrical parameters comprise a total width for each transistor length in said each cell.

13. The method of claim 1, wherein said database information includes a type for each of said plurality of cells, and wherein said target function depends on said type.

14. A processor programmed to implement a method for automatic design of a large scale circuit, the method comprising:
   a) providing a cell library comprising:
      i) a plurality of cells, each cell of said plurality of cells having a corresponding cell function; and
      ii) database information including one or more active region geometrical parameters for said each cell;
      wherein at least two of said plurality of cells have the same cell function and differing active region geometrical parameters;
   b) selecting a plurality of cells from said cell library to provide a cell design of said circuit;
   c) defining a target function of said cell design, wherein said target function is a monotonic function of said one or more active region geometrical parameters of at least one cell in said cell design; and
   d) substituting one or more cells in said cell design with one or more functionally equivalent cells from said cell library one or more times to optimize said cell design according to said target function.

15. The processor of claim 14, wherein said database information further includes physical area for said each cell.

16. The processor of claim 14, wherein said database information includes a performance metric for said each cell.

17. The processor of claim 14, wherein said method further comprises optimizing said cell design to minimize power consumption calculated according to a power consumption model, said optimizing being subsequent to said substituting, whereby minimization of power consumption according to said power consumption model is obtained with reduced design time.

18. The processor of claim 14, wherein said active region geometrical parameters comprise an active region area.

19. The processor of claim 18, wherein said target function is an increasing function of said active region area, and wherein said substituting is performed to minimize said target function, whereby power consumption of said circuit is approximately minimized.

20. The processor of claim 18, wherein said target function is a decreasing function of said active region area, and wherein said substituting is performed to maximize said target function, whereby power consumption of said circuit is approximately minimized.

21. The processor of claim 14, wherein said active region geometrical parameters comprise a total width for each transistor length in said each cell.

22. The processor of claim 14, wherein said database information includes a type for each of said plurality of cells, and wherein said target function depends on said type.

23. A set of computer instructions recorded on a computer-readable medium for implementing a method for automatic design of a large scale circuit, the method comprising:
   a) providing a cell library comprising:
      i) a plurality of cells, each cell of said plurality of cells having a corresponding cell function; and
      ii) database information including one or more active region geometrical parameters for said each cell;
      wherein at least two of said plurality of cells have the same cell function and differing active region geometrical parameters;
   b) selecting a plurality of cells from said cell library to provide a cell design of said circuit;
   c) defining a target function of said cell design, wherein said target function is a monotonic function of said one or more active region geometrical parameters of at least one cell in said cell design; and d) substituting one or more cells in said cell design with one or more functionally equivalent cells from said cell library one or more times to optimize said cell design according to said target function.

24. The set of computer instructions recorded on a computer-readable medium of claim 23, wherein said database information further includes physical area for said each cell.

25. The set of computer instructions recorded on a computer-readable medium of claim 23, wherein said database information includes a performance metric for said each cell.

26. The set of computer instructions recorded on a computer-readable medium of claim 23, wherein said method further comprises optimizing said cell design to minimize power consumption calculated according to a power consumption model, said optimizing being subsequent to said substituting, whereby minimization of power consumption according to said power consumption model is obtained with reduced design time.

27. The set of computer instructions recorded on a computer-readable medium of claim 23, wherein said active region geometrical parameters comprise an active region area.

28. The set of computer instructions recorded on a computer-readable medium of claim 27, wherein said target function is an increasing function of said active region area, and wherein said substituting is performed to minimize said target function, whereby power consumption of said circuit is approximately minimized.

29. The set of computer instructions recorded on a computer-readable medium of claim 27, wherein said target function is a decreasing function of said active region area, and wherein said substituting is performed to maximize said target function, whereby power consumption of said circuit is approximately minimized.

30. The set of computer instructions recorded on a computer-readable medium of claim 23, wherein said active region geometrical parameters comprise a total width for each transistor length in said each cell.

31. The set of computer instructions recorded on a computer-readable medium of claim 23, wherein said database information includes a type for each of said plurality of cells, and wherein said target function depends on said type.

* * * * *